(12) United States Patent
Carlson

(10) Patent No.: US 7,010,028 B2
(45) Date of Patent: Mar. 7, 2006

(54) SYSTEM AND METHOD FOR RAPID GENERATION OF LOW PAR Q-MODE SIGNALS

(75) Inventor: Arthur J. Carlson, Nevada City, CA (US)

(73) Assignee: Broadcom Corporation, Irvine, CA (US)

( * ) Notice: Subject to any disclaimer, the term of this patent is extended or adjusted under 35 U.S.C. 154(b) by 862 days.

(21) Appl. No.: 09/906,332

(22) Filed: Jul. 16, 2001

(65) Prior Publication Data

US 2003/0012272 A1    Jan. 16, 2003

(51) Int. Cl.
*H04B 1/38* (2006.01)
(52) U.S. Cl. ...................................... 375/222; 375/260
(58) Field of Classification Search ................ 375/130, 375/140, 219, 222, 260, 261, 295; 370/206, 370/208, 210, 464, 480
See application file for complete search history.

(56) References Cited

U.S. PATENT DOCUMENTS

| | | | |
|---|---|---|---|
| 5,901,180 A * | 5/1999 | Aslanis et al. | 375/261 |
| 6,031,865 A * | 2/2000 | Kelton et al. | 375/130 |
| 2002/0150036 A1* | 10/2002 | Weerackody | 370/208 |
| 2002/0172184 A1* | 11/2002 | Kim et al. | 370/344 |
| 2003/0039306 A1* | 2/2003 | Redfern | 375/222 |
| 2003/0064737 A1* | 4/2003 | Eriksson et al. | 455/501 |
| 2003/0067866 A1* | 4/2003 | Jung | 370/210 |
| 2004/0136315 A1* | 7/2004 | Chang | 370/206 |

\* cited by examiner

*Primary Examiner*—Chieh M. Fan
(74) *Attorney, Agent, or Firm*—McAndrews, Held & Malloy, Ltd.

(57) ABSTRACT

In a data communication system, a transmitter of an ADSL modem uses a PRBS generator to generate a plurality of ADSL signals. The transmitter computes the Peak to Average (e.g., root-mean-square) ("PAR") ratio of each of the ADSL signals generated. The ADSL signal having the lowest PAR is determined, and the corresponding state of the PRBS generator is noted. The signal having the lowest PAR, or at least the corresponding state of the PRBS generator, is then used to generate a Q-mode signal.

12 Claims, 7 Drawing Sheets

SYSTEM AND METHOD FOR RAPID GENERATION OF LOW PAR Q-MODE SIGNALS

CROSS-REFERENCE TO RELATED APPLICATIONS

N/A

INCORPORATION BY REFERENCE

N/A

STATEMENT REGARDING FEDERALLY SPONSORED RESEARCH OR DEVELOPMENT

N/A

BACKGROUND OF THE INVENTION

Current ADSL modem system designs do not incorporate a low power transmission mode. Such systems require high power dissipation in the modem line driver, even when no data is being transmitted.

Accordingly, ITU contributions have proposed a low power mode (i.e., "Q-mode,") in the transmitter. During the proposed Q-mode, the modem is still in the ready state, but enters a low power mode during periods of no data transmission.

ITU contributions, HC-029R1 and AB-045, formally define a semi-stationary Q-mode signal, that employs a pair of pseudo-random bit sequence ("PRBS") generators, each with a period of greater than 4000. These proposals require two separate signals, namely, a stationary signal and a non-stationary signal. One problem with the resulting Q-mode signal is that it does not have a sufficiently low Peak-to-Average Ratio ("PAR"). The "Average" used may be, for example, the root-mean-square. A signal having a low PAR would enable the analog front end of the modem to reduce the amount of power dissipated in the line driver even further during Q-mode. By reducing power dissipation, a Q-mode signal having a low PAR would correspondingly reduce the amount of heat generated in cabinets containing ADSL equipment. A reduction in heat would in turn make it possible for ADSL service providers to either reduce the size of cabinets for the same number of ADSL modems, or to deploy more ADSL modems per cabinet than is possible with current Q-mode proposals.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a communication system comprising a data communication node, such as an ADSL modem, for example. A transmitter is located in the data communication node, which uses a PRBS generator to generate multiple signals. The transmitter determines the Peak to Average (e.g., root-mean-square) ("PAR") ratio of each of the signals generated, and outputs at least an indication of the signal having the lowest PAR. The signal having the lowest PAR, or at least an indication thereof, is used to generate a non-data mode signal. Such indication may be, for example, the state of the PRBS generator that generated the signal having the lowest PAR.

In an embodiment where the data communication node is an ADSL modem, the signals generated by the PRBS generator may be ADSL signals, and the non-data mode signal may be a Q-mode signal.

In one embodiment, the indication of the signal having the lowest PAR output by the transmitter is communicated to a remote receiver, and is used by the remote receiver to receive the non-data mode signal. Again, the non-data mode signal may be, for example, a Q-mode signal in an ADSL application.

These and other advantages and novel features of the present invention, as well as details of an illustrated embodiment thereof, will be more fully understood from the following description and drawings.

DETAILED DESCRIPTION OF THE INVENTION

Figure 1:
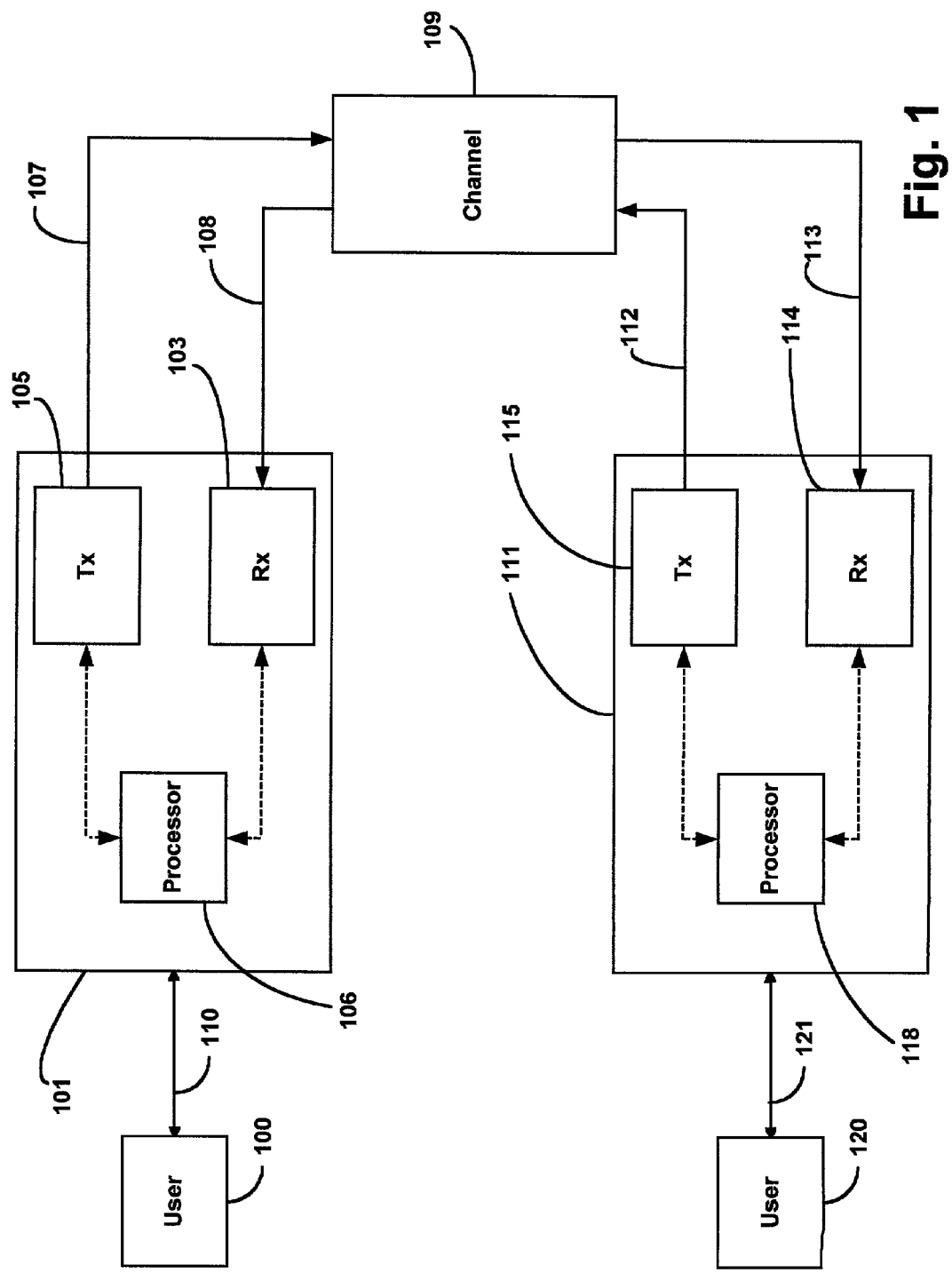
FIG. 1 is a block diagram of a generic communication system that may be employed in connection with the present invention.

FIG. 1 is a block diagram of a generic communication system that may be employed in connection with the present invention. The system comprises a first communication node 101, a second communication node 111, and a channel 109 that communicatively couples the nodes 101 and 111. The communication nodes may be, for example, ADSL modems or any other type of transceiver device that transmits or receives data over a channel. The first communication node 101 comprises a transmitter 105, a receiver 103 and a processor 106. The processor 106 may comprise, for example, a microprocessor. The first communication node 101 is communicatively coupled to a user 100 (e.g., a computer) via communication link 110, and to the channel 109 via communication links 107 and 108.

Similarly, the second communication node 111 comprises a transmitter 115, a receiver 114 and a processor 118. The processor 118, like processor 106, may comprise, for example, a microprocessor. The second communication node 111 is likewise communicatively coupled to a user 120 (again a computer, for example) via communication link 121, and to the channel 109 via communication links 112 and 113.

During operation, the user 100 can communicate information to the user 120 using the first communication node 101, the channel 109 and the second communication node 111. Specifically, the user 100 communicates the information to the first communication node 101 via communication link 110. The information is transformed in the transmitter 105 to match the restrictions imposed by the channel 109. The transmitter 105 then communicates the information to the channel 109 via communication link 107. The receiver 114 of the second communication node 111 next receives, via communication link 113, the information from the channel 109 and transforms it into a form usable by the user 120. Finally, the information is communicated from the second communication node 111 to the user 120 via the communication link 121.

Communication of information from the user 120 to the user 100 may also be achieved in a similar manner. In either case, the information transmitted/received may also be processed using the processors 106/118.

Figure 2:
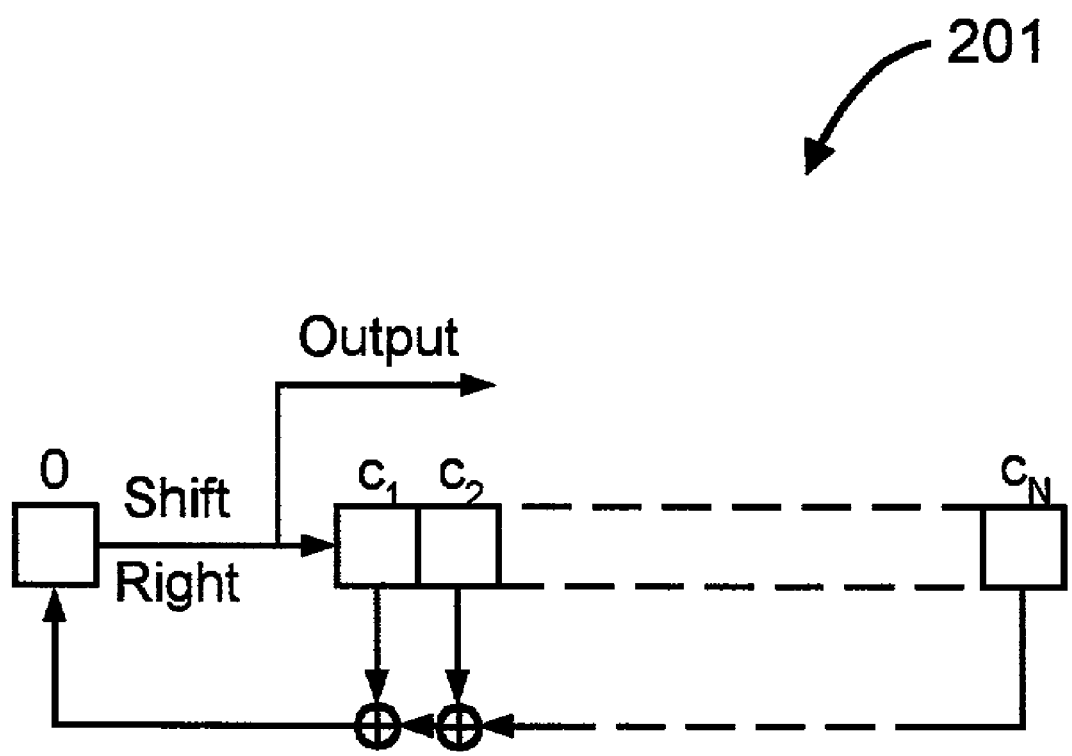
FIG. 2 is a depiction of a generic PRBS generator in accordance with the present invention.

In the case when the communication nodes 101 and 111 of FIG. 1 are ADSL modems, the transmitters 105 and 115 use one or more PRBS generators to generate various signals. FIG. 2 is a depiction of a generic PRBS generator that may be employed in connection with the present invention. PRBS generator 201 outputs a pseudo random bit sequence with a period of $2^N-1$, where each of $i_1, i_2, \ldots i_N$ comprises one of "0" or "1" and $\{i_1, i_2, \ldots i_N\}$ (not all equal to "0") represents the initial state of the PRBS generator 201. $\{c_1, c_2 \ldots c_N\}$ represents the coefficients of a primitive polynomial.

One such signal generated by the transmitters 105 and 115 (of FIG. 1) in ADSL communication is a REVERB signal, as defined in ITU recommendation G.992.1. The REVERB signal is constructed in the frequency domain using all available carriers numbered from 0 to 255, although normally many carriers are missing and one is appropriated for use as a pilot tone used for timing control. Each carrier is modulated using a fixed amplitude and one of four possible phases, a configuration often described as four-point quadrature-amplitude modulation (4-QAM). Two bits can be used to define which of the four phases is used on each carrier. The REVERB signal is formed by encoding two bits onto each carrier, beginning with carrier #0 and continuing through carrier #255. In practice some carriers may be missing, and one carrier is appropriated for use as a pilot tone.

The bits to be encoded on each carrier of the REVERB signal are generated by a pseudo-random bit sequence (PRBS) generator defined by the polynomial $$1+x^{-4}+x^{-9} \quad (1)$$

Figure 3:
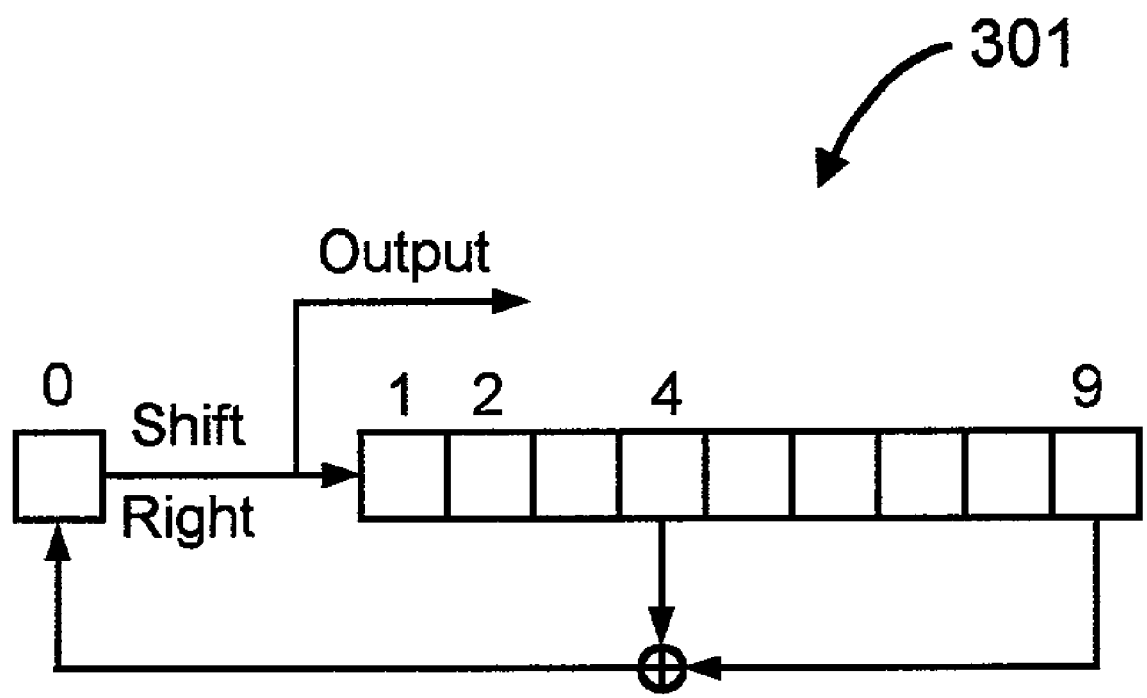
FIG. 3 is one specific embodiment of the PRBS generator of FIG. 2 in accordance with the present invention.

FIG. 3 is a schematic representation of the above polynomial, and is one specific embodiment of the PRBS generator of FIG. 2. PRBS generator 301 is defined by (1), a polynomial of degree 9, and has a period of $2^9-1=511$. As such, the generator can produce 511 distinct pseudo-random sequences of 511, each sequence being a shifted version of any other sequence. ITU recommendation G.992.1 defines which of those 511 sequences is to be used to form the REVERB signal by specifying the first nine outputs of the PRBS to be all ones. Specifically, G.992.1 defines the PRBS sequence $\{d_n\}$ as follows:

$$d_n=1 \text{ for } n=1, 2, \ldots, 9 \quad (2a)$$

$$d_n=d_{n-4} \oplus d_{n-9} \text{ otherwise} \quad (2b)$$

where the symbol $\oplus$ is used to denote the exclusive OR (XOR) operation.

This definition is equivalent to specifying the initial state, $\{i_1, i_2, \ldots i_N\}$, of the shift register in FIG. 3 to be, $\{0,0,0,0,0,1,1,1,1\}$, abreviated here as 000001111. This initial condition assumes that bits are read from left to right (most significant bits are 00000, least significant bits are 1111) and that the first output of the circuit is computed before the first shift is executed. The total number of bits required to specify the encoding for all 256 carriers in a REVERB symbol is 512 (256 carriers, two bits per carrier). If the rule in (2) is used to calculate 512 outputs, the $512^{th}$ output will be the same as the first output.

In accordance with the system and method of the present invention, the principle outlined in (2) is used to generate a signal or signals other than the REVERB signal. For a given set of active carriers, exactly 511 such signals may be defined, one for each cyclic shift of the basic PRBS sequence defined by (2) (FIG. 3). The length of the sequence defined by (1) is one less than the length of the sequence needed to produce 256 pairs of bits to encode an entire REVERB symbol. That is, if the first symbol is defined by generating 512 PRBS outputs (after initializing the PRBS shift register according to rule (2a)), then a new sequence of 512 outputs is computed as follows. First, the PRBS shift register is not reinitialized, but the initial state of the generator for the new sequence is taken to be the final state resulting from generation of the previous sequence. This procedure produces a PRBS sequence different from the first. If the process is repeated 511 times, exactly 511 distinct PRBS sequences are generated.

Next, each of the 511 distinct sequences generated (as set forth above) is used to generate an ADSL symbol, the PAR of each of which is then computed/determined. Finally, the signal with the lowest PAR is selected, and the corresponding initial value of the PRBS generator is noted. Accordingly, the signal with the lowest PAR is determined from the 511 signals considered. Additional detail regarding the determination of the signal having the lowest PAR is discussed below with respect to FIGS. 5 and 6.

In another (or complimentary) embodiment, different gains may be assigned to each of the carriers that forms a symbol. In the Q-mode application, this gain would be the same as that employed on the same carrier during SHOWTIME.

Figure 4:
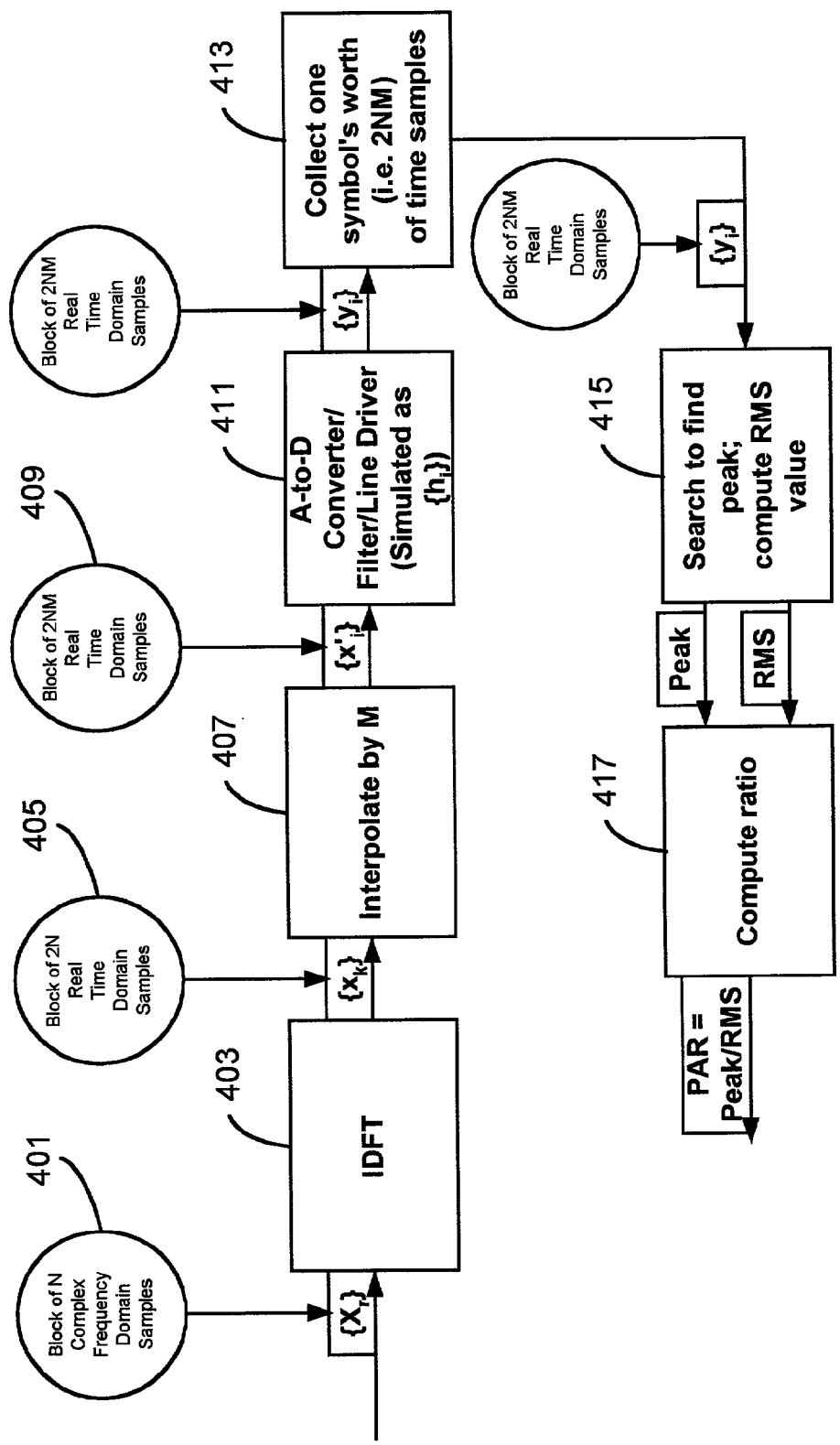
FIG. 4 is a functional block diagram of one embodiment of a method for computing/determining the PAR of an ADSL symbol.

FIG. 4 is a functional block diagram of one embodiment of a method for computing/determining the PAR of an ADSL symbol. The embodiment of FIG. 4 starts with a frequency-domain description of the symbol consisting of a set of complex amplitudes, $\{X_r; r=0, 1, \ldots, N-1\}$ (reference numeral 401). Next, at block 403, the real inverse discrete Fourier transform (RIDFT) of $\{X_r\}$ is computed yielding $\{x_k; k=0, 1, \ldots, 2N-1\}$, a block of 2N real time domain samples (reference numeral 405). The $\{x_k\}$ sequence is then interpolated (block 407) to form $\{x'_i; i=0, 1, \ldots, 2NM-1\}$ where $$x'_{Mi}=x_i.$$

$\{x'_i\}$ is a block of 2NM real time domain samples (reference numeral 409). The $\{x'_i\}$ sequence is next filtered with $\{h_i; i=0, 1, \ldots, L-1\}$ (block 411), a filter representing the A-to-D converter, analog filter, and line driver of the transmitter. The output of the filter is the sequence $\{y_i; i=0, 1, \ldots, 2 MN+L-2\}$ where $$y_i = \sum_{j=0}^{L-1} h_j x'_{i-j}.$$

One symbol's worth (i.e., 2NM) of time samples is collected (block 413). Next, the maximum value of the absolute value of the elements of $\{y_i\}$, $Y_{max}$, and the value of the RMS value of $\{y_i\}$, $Y_{RMS}$, are found (block 415) where $$y_{RMS} = \sqrt{\frac{\sum_{i=0}^{2MN-1} y_i^2}{2MN}}.$$

Finally, the PAR for the ADSL symbol under consideration is computed as $$PAR = \frac{y_{max}}{y_{RMS}},$$

(block 417) a ratio often expressed in dB as $PAR_{dB} = 20 \log_{10}(PAR).$

This process is repeated for each ADSL symbol generated, as mentioned above.

Figure 5:
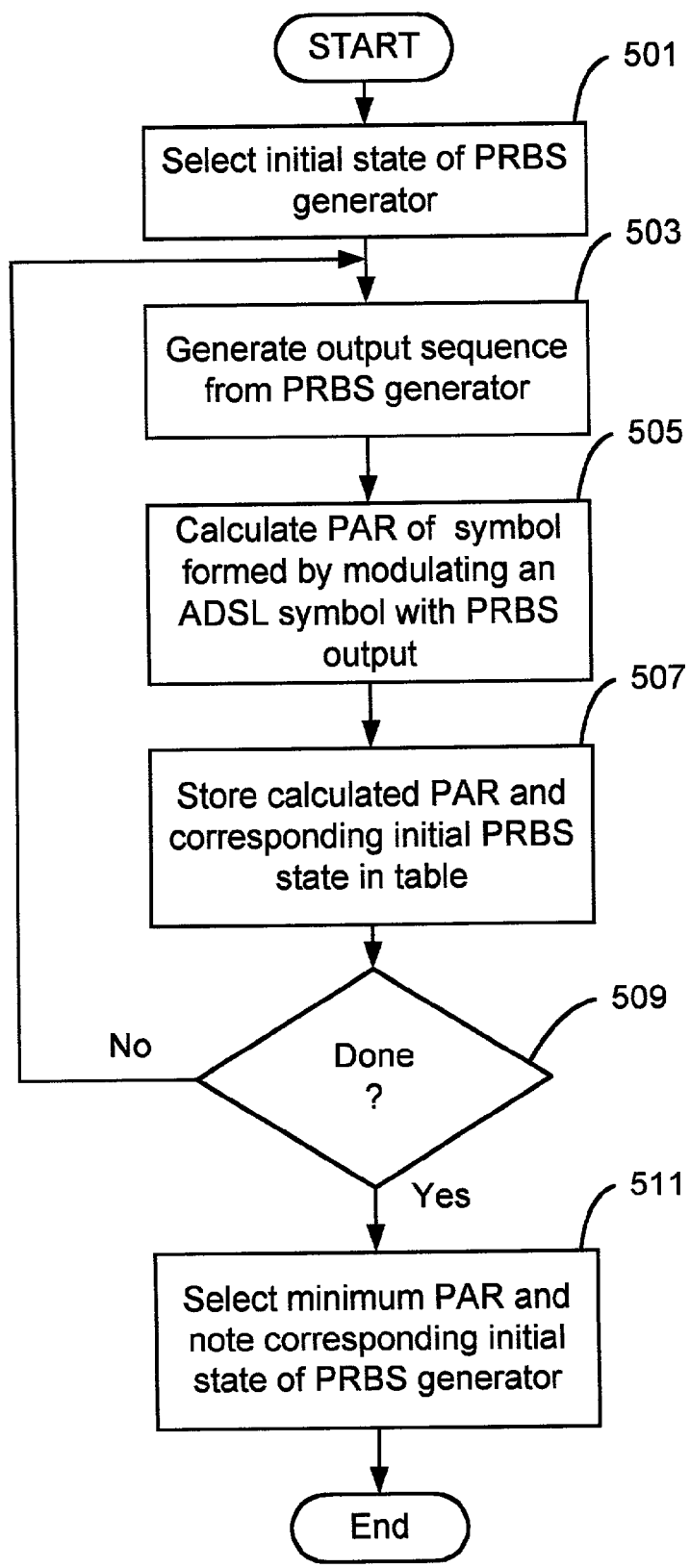
FIG. 5 is a flow diagram of one embodiment for obtaining a signal with the lowest PAR.

FIG. 5 is a flow diagram of one embodiment for obtaining a signal with the lowest PAR using a particular PRBS generator. First, the initial state of the PRBS generator is selected (block 501). Next, an output from the PRBS generator is obtained (block 503). The PRBS generator used and its initial state may be those discussed above with reference to FIG. 3, for example. The PAR of the symbol formed is then calculated by modulating an ADSL symbol with the PRBS output (block 505). The PAR may be calculated using the method discussed above with reference to FIG. 4. Next, the calculated PAR and the corresponding initial state are stored in a table, for example (block 507).

A determination is then made whether the system is "done" (block 509). "Done" may mean that either the system has performed all possible calculations based on the PRBS generator length, or has performed enough calculations to obtain a reasonable representative sample (e.g., 1000). If the system is not "done," the process is repeated (starting at block 503). As mentioned above, the PRBS generator is not reinitialized each time the process of FIG. 5 is repeated. Instead, the initial state of the PRBS generator for each new iteration is set as the final state of the PRBS generator that results from the previous iteration.

Finally, when the determination is made that the system is indeed "done" (block 509), the minimum PAR value is selected from the table (block 511). Also, the corresponding initial state of the PRBS generator is noted (block 511).

Figure 6:
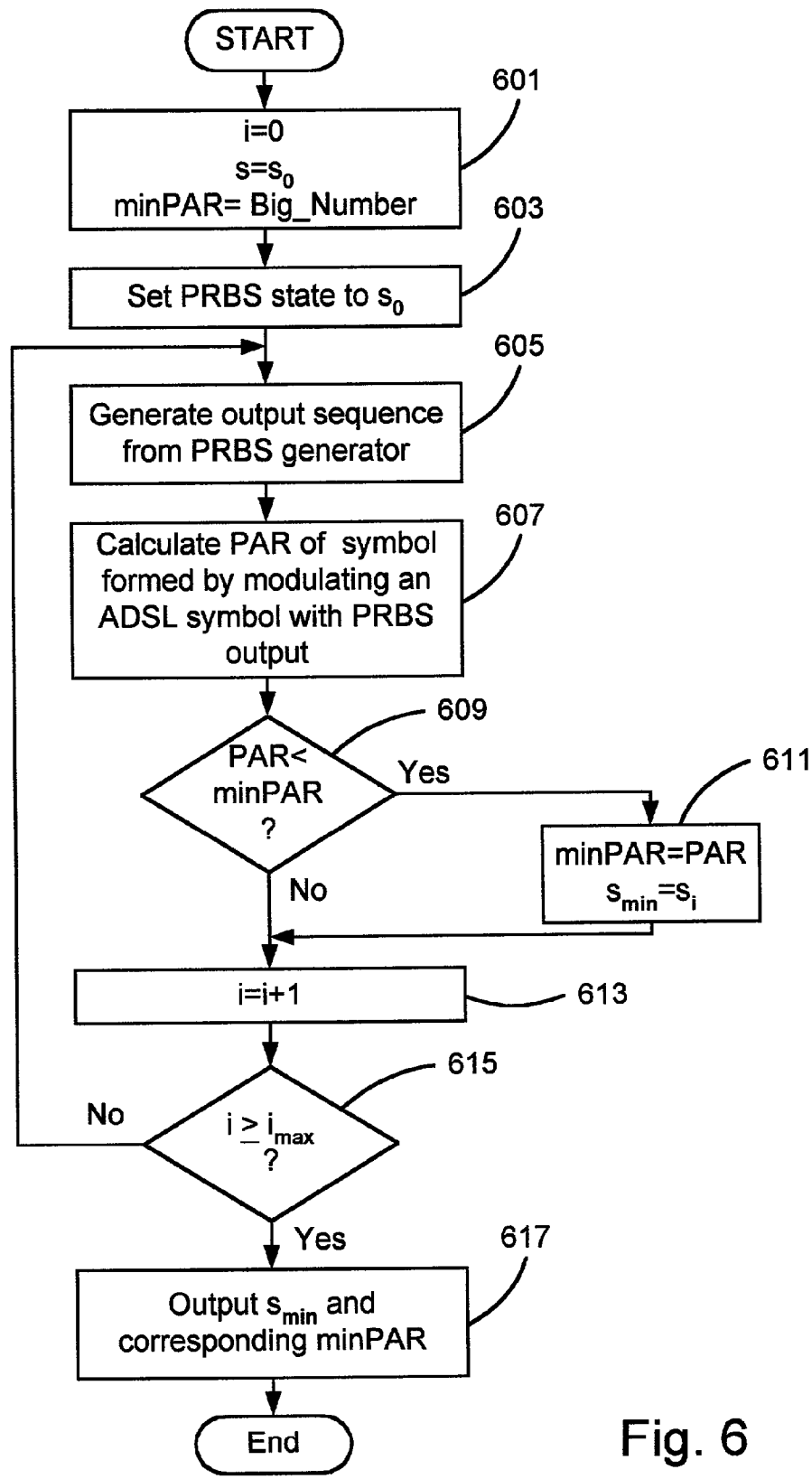
FIG. 6 is a more detailed flow diagram of one embodiment of a method for obtaining a signal with the lowest PAR.

FIG. 6 is a more detailed flow diagram of one embodiment of a method for obtaining a signal with the lowest PAR. First, the system is initialized, with the counter or iteration variable, i, being set to 0, the PRBS state variable, s, being set to $s_0$, and minPAR being set to a large number (block 601). The initial PRBS state is then selected to be $s_0$ (block 603) where $s_0$ does not correspond to the all-zero state. Next, a sequence of outputs from the PRBS generator is obtained (block 605) sufficient to modulate one ADSL symbol. The PRBS generator used and its initial state may again be those discussed above with reference to FIG. 3, for example. The PAR of the symbol formed is then calculated by modulating an ADSL symbol with the PRBS output (block 607). The PAR may again be calculated using the method discussed above with reference to FIG. 4.

Next, a determination is made whether the PAR calculated is less than minPAR (block 609). If the calculated PAR is indeed less than minPAR, then minPAR is reset as PAR, and the corresponding initial state of the PRBS generator (i.e. $s_{min}$, the initial state corresponding to minPAR) is set to be $s_i$. If the calculated PAR is not less than minPAR, then the previous minPAR and $s_{min}$ are maintained.

In either case, the counter or iteration variable, i, is incremented (block 613), and a determination is made whether i is greater than or equal to $i_{max}$ (block 615). In other words, a determination is made whether all iterations have been completed (i.e., whether the system is "done"). If all iterations have not been completed (i.e., i is less than $i_{max}$), then, another iteration is undertaken (starting at block 605).

Again, as mentioned above, the PRBS generator is not reinitialized for each iteration. Instead, the initial state of the PRBS generator for each new iteration is set as the final state of the PRBS generator that results from the previous iteration. In other words, the PRBS state at the start of each iteration (i.e., immediately before the output sequence from the PRBS is generated at block 605) is $s_i$.

Finally, when the determination is made that i is indeed greater than or equal to $i_{max}$, minPAR and the corresponding $s_{min}$ are output (e.g., selected from memory) (block 617).

Based on the above, the overall operation of one embodiment of the system based on the PRBS defined by (1) may take place as follows:

1. Characterize the A-to-D converter/filter/line driver of FIG. 4 for the particular implementation of the ADSL modem per the example discussed above. (i.e., determine $\{h_i; i=0, 1, \ldots, N-1\}$.

2. During modem training note the set of active carriers to be used.

3. Using that set of carriers,
   3.1 Initialize the shift register of the PRBS defined in (1) and in FIG. 3 to any non-zero value.
   3.2 Operate the shift register 512 times, grouping the output bits into groups of 2.
   3.3 Form a frequency-domain ADSL symbol by modulating the $i^{th}$ active carrier with the $i^{th}$ pair of bits from the set obtained in Step 3.2 for i=0 to 255 using any subset of the entire set of carriers and any desired set of gains for the set of active carriers.
   3.4 Calculate the PAR of the resulting symbol using the method discussed with respect to FIG. 4.
   3.5 Repeat the above steps $2^9-2=510$ times starting with Step 3.2, remembering at each step the minimum PAR obtained as well as the initial state of the PRBS shift register that produced that minimum.
   3.6 The result is the overall minimum PAR as well as the initial state of the PRBS shift register that produced that overall minimum.

In the greater scheme of Q-mode operation, it may be desirable for one modem to calculate the best (i.e., lowest PAR) Q-mode signal and to communicate the results of its calculations to the remote modem. A specification for the Q-mode signal calculated by the transmitter on one end of a connection may need to be communicated to the receiver on the opposite end of the connection. Transmitting only the bits that define the initial state of the PRBS generator is sufficient to inform the remote receiver how to construct the Q-mode signal.

Figure 7:
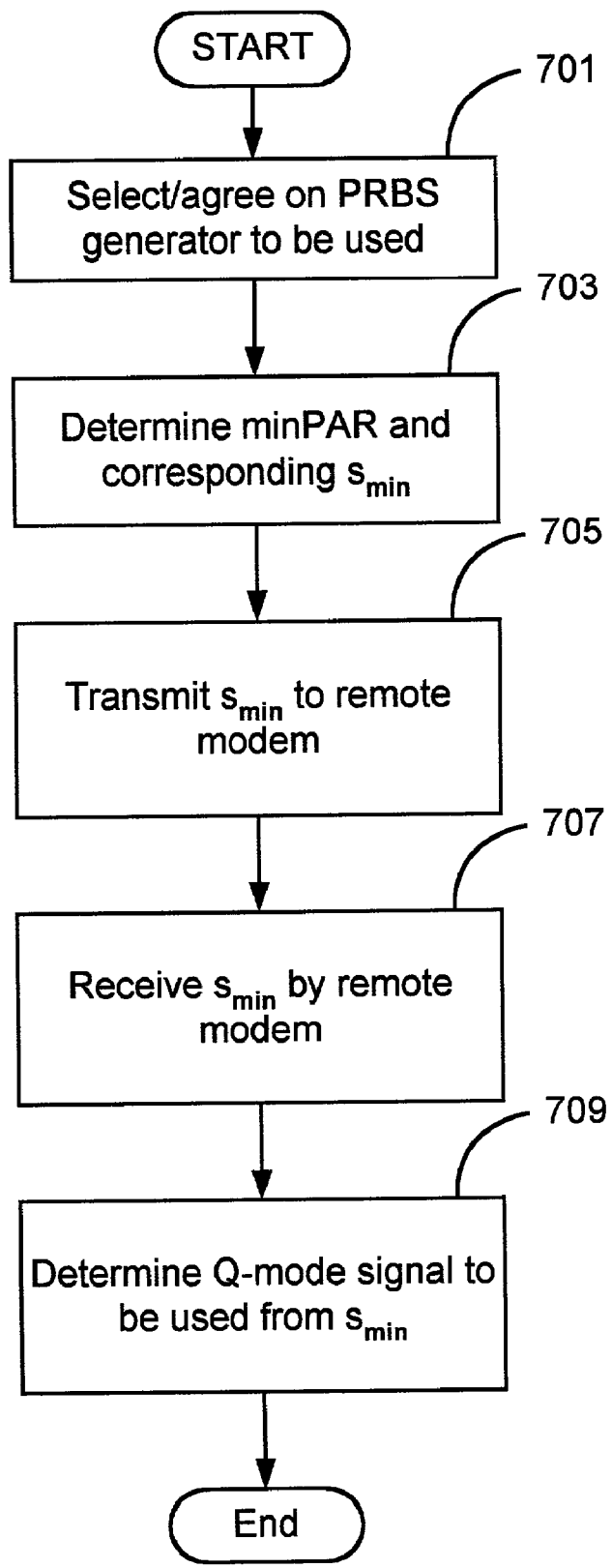
FIG. 7 is a flow diagram of one embodiment of communication between ADSL modems according to the present invention.

FIG. 7 is a flow diagram of communication between ADSL modems according to one embodiment of the present invention. First, a PRBS generator is selected/agreed on by the modem(s) (block 701). Next, minPAR and $s_{min}$ are determined (block 703). This may be achieved by the method discussed above with respect to FIG. 6. The $s_{min}$ determined is then transmitted to the remote modem (block 705), and received by the remote modem (block 707). Finally, the remote modem uses the $s_{min}$ received to determine the Q-mode signal to be used (block 709).

While one embodiment of the invention discussed above assumes that the polynomial of (1) (see FIG. 2) defines the PRBS generator to be used to define the ADSL Q-mode symbol, other PRBS generators may also be used. For example, the shorter PRBS defined by $$1+x^{-2}+x^{-3}+x^{-4}+x^{-8} \tag{3}$$

can be used as well. In fact, in one study of 26 cases, this shorter PRBS (its length is $2^8-1=255$) leads to a smaller minimum PAR than did (2) on 24 of the 26 cases. Therefore, there is no need to restrict the length of PRBS to be used to generate the low PAR signals. Exactly the same procedure described above may be used for any PRBS.

Many modifications and variations of the present invention are possible in light of the above teachings. Thus, it is to be understood that, within the scope of the appended claims, the invention may be practiced otherwise than as described hereinabove.

The invention claimed is:

1. A communication system comprising:
a data communication node;
a transmitter located in the data communication node, the transmitter having a pseudo-random bit sequence (PRBS) generator, the transmitter using the PRBS generator to generate a plurality of signals, the transmitter determining the peak-to-average ratio (PAR) of each of the plurality of signals generated and outputting at least an indication of a one of the plurality of signals having a lowest PAR; and
wherein the one of the plurality of signals having the lowest PAR is used to generate a non-data made signal.

2. A communication system comprising:
a data communication node;
a transmitter located in the data communication node, the transmitter having a pseudo-random bit sequence (PRBS) generator, the transmitter using the PRBS generator to generate a plurality of signals, the transmitter determining the peak-to-average ratio (PAR) of each of the plurality of signals generated and outputting at least an indication of a one of the plurality of signals having a lowest PAR; and
wherein the data communication node comprises an ADSL modem, the plurality of signals comprises a plurality of ADSL signals, and the one of the plurality of signals having the lowest PAR is used to generate a Q-mode signal.

3. A communication system comprising:
a data communication node;
a transmitter located in the data communication node, the transmitter having a pseudo-random bit sequence (PRBS) generator, the transmitter using the PRBS generator to generate a plurality of signals, the transmitter determining the peak-to-average ratio (PAR) of each of the plurality of signals generated and outputting at least an indication of a one of the plurality of signals having a lowest PAR; and
wherein the at least an indication of the one of the plurality of signals having the lowest PAR produced by the transmitter is communicated to a remote receiver, and is used by the remote receiver to receive a non-data mode signal.

4. A communication system comprising:
a data communication node;
a transmitter located in the data communication node, the transmitter having a pseudo-random bit sequence (PRBS) generator, the transmitter using the PRBS generator to generate a plurality of signals, the transmitter determining the peak-to-average ratio (PAR) of each of the plurality of signals generated and outputting at least an indication of a one of the plurality of signals having a lowest PAR; and
wherein the data communication node comprises an ADSL modem, the plurality of signals comprises a plurality of ADSL signals, and the at least an indication the one of the plurality of signals having the lowest PAR output by the transmitter is communicated to a remote receiver, and is used by the remote receiver to receive a Q-mode signal.

5. A communication system comprising:
a data communication node;
a transmitter located in the data communication node, the transmitter having a pseudo-random bit sequence (PRBS) generator, the transmitter using the PRBS generator to generate a plurality of signals, the transmitter determining the peak-to-average ratio (PAR) of each of the plurality of signals generated and outputting at least an indication of a one of the plurality of signals having a lowest PAR; and
wherein the at least an indication of the one of the plurality of signals having the lowest PAR comprises a state of the PRBS generator that generated the one of the plurality of signals having the lowest PAR.

6. A communication system comprising:
a data communication node;
a transmitter located in the data communication node, the transmitter having a pseudo-random bit sequence (PRBS) generator, the transmitter using the PRBS generator to generate a plurality of signals, the transmitter identifying a one of the plurality of signals generated having a lowest peak-to-average ratio (PAR); and
wherein the one of the plurality of signals having the lowest PAR is used to generate a non-data mode signal.

7. A communication system comprising:
a data communication node;
a transmitter located in the data communication node, the transmitter having a pseudo-random bit sequence (PRBS) generator, the transmitter using the PRBS generator to generate a plurality of signals, the transmitter identifying a one of the plurality of signals generated having a lowest peak-to-average ratio (PAR); and
wherein the data communication node comprises an ADSL modem, the plurality of signals comprises a plurality of ADSL signals, and the one of the plurality of signals having the lowest PAR is used to generate a Q-mode signal.

8. A communication system comprising:
a data communication node;
a transmitter located in the data communication node, the transmitter having a pseudo-random bit sequence (PRBS) generator, the transmitter using the PRBS generator to generate a plurality of signals, the transmitter identifying a one of the plurality of signals generated having a lowest peak-to-average ratio (PAR); and
wherein the data communication node comprises an ADSL modem, the plurality of signals comprises a plurality of ADSL signals, and a state of the PRBS generator that generated the one of the plurality of signals having the lowest PAR is communicated to a remote receiver, and is used by the remote receiver to receive a Q-mode signal.

9. A communication system comprising:
a data communication node;
a transmitter located in the data communication node, the transmitter having a pseudo-random bit sequence (PRBS) generator, the transmitter using the PRBS generator to generate a plurality of signals, the transmitter identifying a one of the plurality of signals generated having a lowest peak-to-average ratio (PAR); and
wherein a state of the PRBS generator that generated the one of the plurality of signals having the lowest PAR is communicated to a remote receiver, and is used by the remote receiver to receive a non-data mode signal.

10. A method of operating a transmitter in a data communication system, the transmitter having a pseudo-random bit sequence (PRBS) generator, the method comprising:
generating a plurality of signals using the PRBS generator;
determining a one of the plurality of signals generated having a lowest peak-to-average ratio (PAR);
outputting at least an indication of the one of the plurality of signals having the lowest PAR;
communicating the at least an indication of the one of the plurality of signals having the lowest PAR to a remote receiver;
receiving by the remote receiver the at least an indication of the one of the plurality of signals having the lowest PAR; and
generating using the at least an indication of the one of the plurality of signals having the lowest PAR a non-data mode signal.

11. The method of claim 10 wherein the at least an indication of the one of the plurality of signals having the lowest PAR comprises a state of the PRBS generator that generated the one of the plurality of signals having the lowest PAR.

12. The data communication system of claim 11 wherein the communication node comprises an ADSL modem, and the non-data mode signal comprises a Q-mode signal.

* * * * *

UNITED STATES PATENT AND TRADEMARK OFFICE
CERTIFICATE OF CORRECTION

PATENT NO. : 7,010,028 B2
APPLICATION NO. : 09/906332
DATED : March 7, 2006
INVENTOR(S) : Arthur J. Carlson It is certified that error appears in the above-identified patent and that said Letters Patent is hereby corrected as shown below:

Column 7, line 37, please delete "made" and insert --mode--.

Signed and Sealed this

Twentieth Day of March, 2007

JON W. DUDAS
*Director of the United States Patent and Trademark Office*